United States Patent

[11] 3,576,573

[72] Inventor Charles V. Symons
San Jose, Calif.
[21] Appl. No. 761,522
[22] Filed Sept. 23, 1968
[45] Patented Apr. 27, 1971
[73] Assignee International Business Machines Corporation
Armonk, N.Y.

[54] SYSTEM FOR SELECTING A SUBSTITUTE ELECTRICALLY OPERATED ELEMENT
1 Claim, 1 Drawing Fig.

[52] U.S. Cl. 340/174.1B
[51] Int. Cl. G11b 5/46
[50] Field of Search 340/174.1 (B) (C), 146.1 (32); 179/100.2 (MI)

[56] References Cited

UNITED STATES PATENTS

| | | | |
|---|---|---|---|
| 2,950,464 | 8/1960 | Hinton et al. | 340/174.1 |
| 3,147,462 | 9/1964 | Levinson et al. | 340/174.1 |
| 3,409,877 | 11/1968 | Alterman et al. | 340/146.1 |
| 3,451,042 | 6/1969 | Jensen et al. | 340/146.1 |

FOREIGN PATENTS

| | | | |
|---|---|---|---|
| 236,697 | 4/1959 | Australia | 340/174.1 |

*Primary Examiner*—Bernard Konick
*Assistant Examiner*—Vincent P. Canney
*Attorneys*—Hanifin & Jancin and Nathan N. Kallman

ABSTRACT: A system for selecting an electrical element of a group of like elements includes a sensor that responds to a combination of signals, such signals being directed to energizing a selected element. In the event that the selected element becomes defective or nonoperative, then a logic system is adjusted to change the signal combination to the sensor, so as to block energization of such defective element, and to substitute another like operative element.

PATENTED APR 27 1971 3,576,573
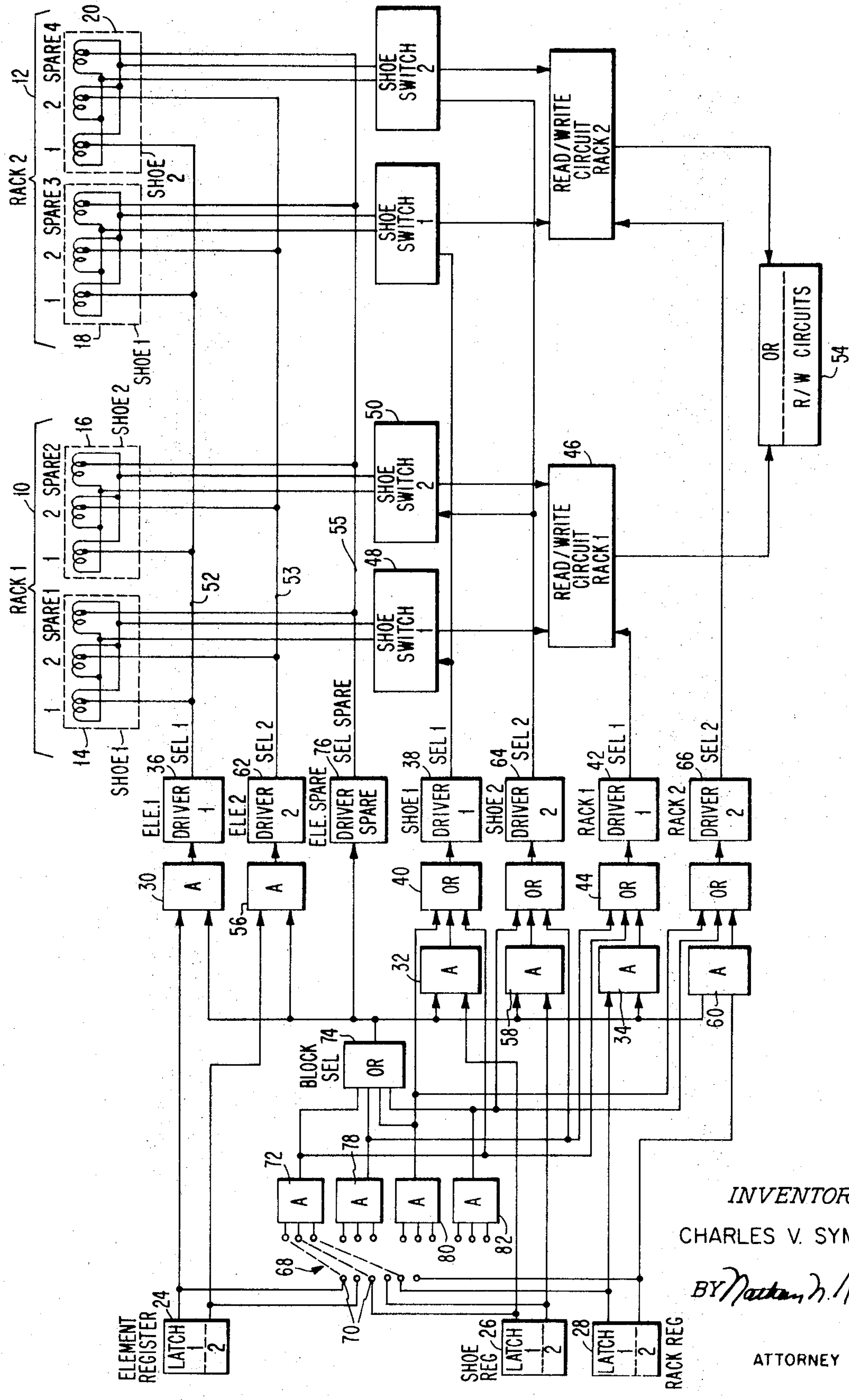
INVENTOR
CHARLES V. SYMONS
BY Nathan N. Kallman
ATTORNEY

SYSTEM FOR SELECTING A SUBSTITUTE ELECTRICALLY OPERATED ELEMENT

BACKGROUND OF THE INVENTION

1. Field of the Invention

This invention relates to a system for electrical element selection, and in particular to an improved method and means for substituting a spare magnetic transducer and record track for a defective transducer-track combination in a fixed head magnetic disc file.

2. Description of Prior Art

In some types of storage systems, such as magnetic disc files, several fixed head assemblies or shoes, each including a multiplicity of transducing elements, are utilized in cooperation with a record medium having a plurality of data tracks. In those cases where a large number of elements are employed, spare elements are provided with the apparatus, so that when one transducer or track becomes defective, a spare element and its associated track may be used instead. This substitution requires switching leads from the defective element to an inactive line, and rewiring a spare element to make it operative.

Generally, in presently known magnetic disc files, the magnetic discs and the head assemblies are necessarily located in an airtight enclosure, so that dust and other contaminants do not enter to affect and degrade the operation of the file. However, when it is necessary to effect a change to a spare transducer and track, the enclosure must be opened for rewiring of both the defective and spare transducers, thereby exposing the enclosure and discs to ambient room conditions, and allowing the entry of foreign particles.

SUMMARY OF THE INVENTION

An object of this invention is to provide a means for substitution of a spare operative element for a defective element in an electrical system, without the need for physical replacement or rewiring of the element itself.

Another object of this invention is to provide a system wherein any one of a number of spare elements distributed through the system is available for substitution of any of the normally operating elements that become defective, although the selected spare element is not part of the same immediate assembly as the defective element.

Another object of this invention is to provide for automatic switching from one electrical element to another element in an enclosed system, without the need to open the enclosure which encompasses the elements.

Another object is to provide a means for substituting a spare transducer for a defective transducer in an enclosed magnetic disc file, without physical access to such transducers.

According to this invention, a system for substituting a spare element for a defective element comprises a logic system including a logic decode network responsive to address signals. In response to a selected logic decode signal, a sensor circuit energizes the selected spare element, and deenergizes or blocks operation of the defective element.

In a particular embodiment of this invention, a multiplicity of fixed magnetic transducers within an airtight enclosure are positioned for scanning respective data tracks on a magnetic disc. A portion of such transducers are allotted to serve as spares and are not normally addressed by the system. However, in the event that an operating transducer or its associated record track becomes defective, then the logic to the sensor circuit is adjusted by means external to the enclosure, so that the defective transducer-track combination is blocked from further operation, and another similar spare transducer and associated track are used instead. In this manner, there is no need to open the enclosure in order to replace or rewire any of the transducer elements. By means of this invention, all the spare transducers of the system are made available for substitution of any of the transducer elements, so that a great savings in maintenance time is realized, and the clean environment of the enclosure is maintained.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

The sole FIGURE of the drawing is a block and schematic diagram of a portion of a data processing apparatus, employed in accordance with this invention.

DESCRIPTION OF THE PREFERRED EMBODIMENT

In particular embodiment of the invention depicted in the drawing, two head assembly racks 10 and 12 are representationally shown, each rack including two magnetic head assemblies or shoes 14, 16 and 18, 20 respectively. Each head shoe has two normally operating transducing elements, designated as 1 and 2, and one spare element. Since there are four head shoes illustrated in this particular embodiment, there are four spare elements available. The quantities of racks, shoes and transducing elements illustrated herein are given by way of example, it being understood that other quantities and combinations of racks, head shoes and elements may be used.

In the drawing, the illustrated selection circuit represents only a portion of the total circuitry which is generally utilized with all the head shoes and transducing elements of a fixed head disc file. The specific selection circuit depicted in the drawing can operate normally to energize any of the transducing elements or 2 of head shoes 14, 16, 18 or 20.

Let us assume that a selection signal is received from a central processing unit or computer (not shown) and directed to energize element 1 of shoe 14. In such event, the selection or matrix signal is applied to the latch circuits 1 of address registers, namely, element register 24, shoe register 26 and rack register 28 respectively. When these No. 1 latches are set, AND gates 30, 32 and 34 respectively trigger drive circuit 36, drive circuit 38 through OR gate 40 and drive circuit 42 through OR gate 44. Drive circuit 42 feeds a drive signal to read-write circuitry 46 which is coupled to the elements of rack 10 through shoe switch 48 or shoe switch 50. Since shoe drive 38 is energized to close switch 48, head shoe assembly 14 is actively connected to the read-write circuit 46. To close the circuit and complete the selection of the desired transducer element, drive 36 feeds a signal through element selection line 52 to the center tap of the coil winding for element 1 of shoe assembly 14. Thus a closed circuit including the selected element is formed, connecting the selected element to a read-write circuit 54 for utilization in a data processing system.

It is apparent that the logic network depicted in the drawing can serve to actuate any one of the normally operating transducing elements 1 or 2 in shoe assemblies 14, 16, 18 or 20, while maintaining the other elements inactive during the period of operation of the selected element. For example, if element 2 of head shoe 20 is selected, then latch position 2 is set for the registers 24, 26 and 28, thereby opening AND gates 56, 58 and 60. Drive circuits 62, 64 and 66 and their respective selection channels are connected to activate element 2 of head shoe 20. Each of the eight normally operating elements is tied to a different combination of the three selection channels, there being $2^3$ permutations available.

In accordance with this invention, if one of the normally operating fixed elements 1 or 2 of any of the head shoes 14, 16, 18 or 20 becomes defective, and unable to cooperate in transducing relation with its associated record track, then a modification of the selection logic network is made to bypass the defective element when it is addressed by the computer and to substitute a spare element in its stead. The modification may be made without opening any enclosures within which the transducing elements, shoes and racks are positioned. Also there is no need to rewire the head assemblies themselves.

To this end, a sensor circuit comprising a bypass and blocking logic circuit is interposed between the registers 24, 26, 28 and the selection channels including the drive circuits 36, 38, 42, 62, 64 and 66. Let us assume that element 1 of shoe 14 is now defective, and that we wish to substitute the spare element of shoe 14 instead. In such event, three jumper connections 68 are made from the three latch 1 output terminals 70 of the registers 24, 26 and 28 to a three-input AND gate 72, which connects to the selection channels for rack 10 and head shoe 14, and to a spare selection channel. Thus, when an address signal is received from the computer, designating transducing element 1 of shoe 14, now defective, to be the active element, the signal is applied to the bypass circuit including AND gate 72 and then directed to OR gate 74. The OR gate 74, which serves to activate the spare selection channel and to block the element selection channels 52 and 53, triggers a drive circuit 76 in the spare selection channel. OR gate 74 also blocks addresses to AND gates 32, 34, 58 and 60, while a new address is initiated from AND gate 72.

The spare selection line 55 is tied to each of the four spare transducing elements in head shoes 14, 16, 18 and 20. AND gate 72 directs a signal of proper polarity through OR gates 40 and 44, which triggers drive circuits 38 and 42 in the selection channels for rack 10, shoe 14. As a result, the spare element in shoe 14 is activated, while all other elements remain inactive.

To achieve blocking of the addressed defective element 1 of shoe 14, the OR gate 74 passes a signal of negative polarity to AND gate 30, so that gate 30 blocks the signal from register 24 to drive circuit 36. Therefore, defective element 1 of shoe 14 remains inactive and inoperative, while the spare element of shoe 14 operates instead. At such time, OR gate 74 blocks all addresses to the AND gates 32, 34, 56, 58 and 60 as well.

It should be noted that other three-input AND gates 78, 80 and 82 are available to connect the spare elements from shoe 16, 18 or 20, respectively, if so desired, as a substitute for any defective element. Obviously, it is not necessary to restrict the substitution to the spare on the same rack as the defective element.

The selection of any available spare may be made by the operator when necessary. A chart may be kept indicating the correspondence of the spares with the addresses, and reasons for sparing. By way of example, AND gate 78 will energize spare element 2 of shoe 16, AND gate 80 will energize spare element 3 of shoe 18, and AND gate 82 will energize spare element 4 of shoe 20. The three input terminals of any sensor AND gate are connected to the combination of output terminals from those latch circuits of the registers 24, 26, 28 which relate to the transducing element that is to be bypassed.

Also, the logic selection system disclosed herein allows the testing of the electrical elements without the need to change the wiring, by coupling a test line to the OR gate 74. The novel selection apparatus affords a savings in matrix circuitry, hardware, and the number of spares, as well as eliminating the need to shelf stock spare assemblies.

The scope of this invention is not limited to the selection of magnetic transducing elements, but is applicable to systems employing other types of expendable electrical units, particularly those which require rewiring and physical replacement or adjustment. While the invention has been particularly shown and described with reference to a preferred embodiment thereof, it will be understood by those skilled in the art that the foregoing and other changes in form and details may be made therein without departing from the spirit and scope of the invention.

I claim:

1. In an apparatus having a multiplicity of normally operational magnetic head elements wherein any one of such operational elements is to be selected for operation in response to an address signal comprising:

a plurality of racks, each of said racks having a plurality of shoes connected to said rack, each of said shoes having a plurality of normally operational magnetic head elements connected to said shoe;

an address register for storing the address of said operational element to be selected;

a plurality of spare magnetic head elements, the number of said spare elements being equal to or less than the number of said shoes and each said shoe having one or none of said spare elements connected to said shoe;

a first selection means connected to said address register for selecting said operational element addressed in said address register, said first selection means having a plurality of element drivers, a plurality of shoe drivers and a plurality of rack drivers connected respectively to said rack, shoes and operational element;

a conversion means for converting the address of any of said operational elements to the address of any said spare element, said conversion means converting the address of said address operational element into the address of said spare element whenever a bad address is detected in said address register by said conversion means;

an inhibit means for inhibiting selection by said first selection means of said addressed operational element in the said address register whenever a bad address is detected as being stored in said address register by said conversion means, said inhibit means further activating a spare element driver which is connected to all said spare elements in said apparatus; and a second selection means connected to said conversion means for completing selection of said spare element as dictated by said conversion means, said second selection means connected in common with the plurality of shoe drivers and the plurality of rack drivers associated with the said first selection means, the combination of said second selection means and said inhibit means causing said spare element indicated by said conversion means to be fully selected and made operational in place of the operational element addressed in said address register.